May 21, 1935. J. H. ROETHEL Re. 19,579

WINDOW CONTROL MECHANISM

Original Filed June 10, 1932

Inventor:
John H. Roethel
By Dike, Calver & Gray
Attorneys.

Reissued May 21, 1935

Re. 19,579

UNITED STATES PATENT OFFICE 19,579

WINDOW CONTROL MECHANISM

John H. Roethel, Detroit, Mich.

Original No. 1,974,196, dated September 18, 1934, Serial No. 616,511, June 10, 1932. Application for reissue February 11, 1935, Serial No. 6,007

19 Claims. (Cl. 268—126)

This invention relates to regulators or controlling mechanisms for windows, particularly for use in motor vehicles or the like, an object of the invention being to provide improved means of relatively simple, economical and durable construction for raising and lowering the window.

A further object of the invention is to provide an improved window regulator or mechanism especially adapted for installation, for example, in the body or door of an automobile, and in which improved gear mechanism is provided for operating a pair of swinging arms adapted to be connected to the lower edge of the window.

A further object of the invention is to provide an improved window regulator of the type having a pair of swinging arms for raising and lowering the window and wherein the arms are operated through the medium of improved gearing including a compound gear preferably formed from a single metal blank to provide two gears of different diameters.

The invention possesses further objects and advantages, all of which will be brought out in the following detailed description, illustrated throughout the accompanying drawing, and more particularly pointed out in the appended claims.

Figures 1, 2, 3:
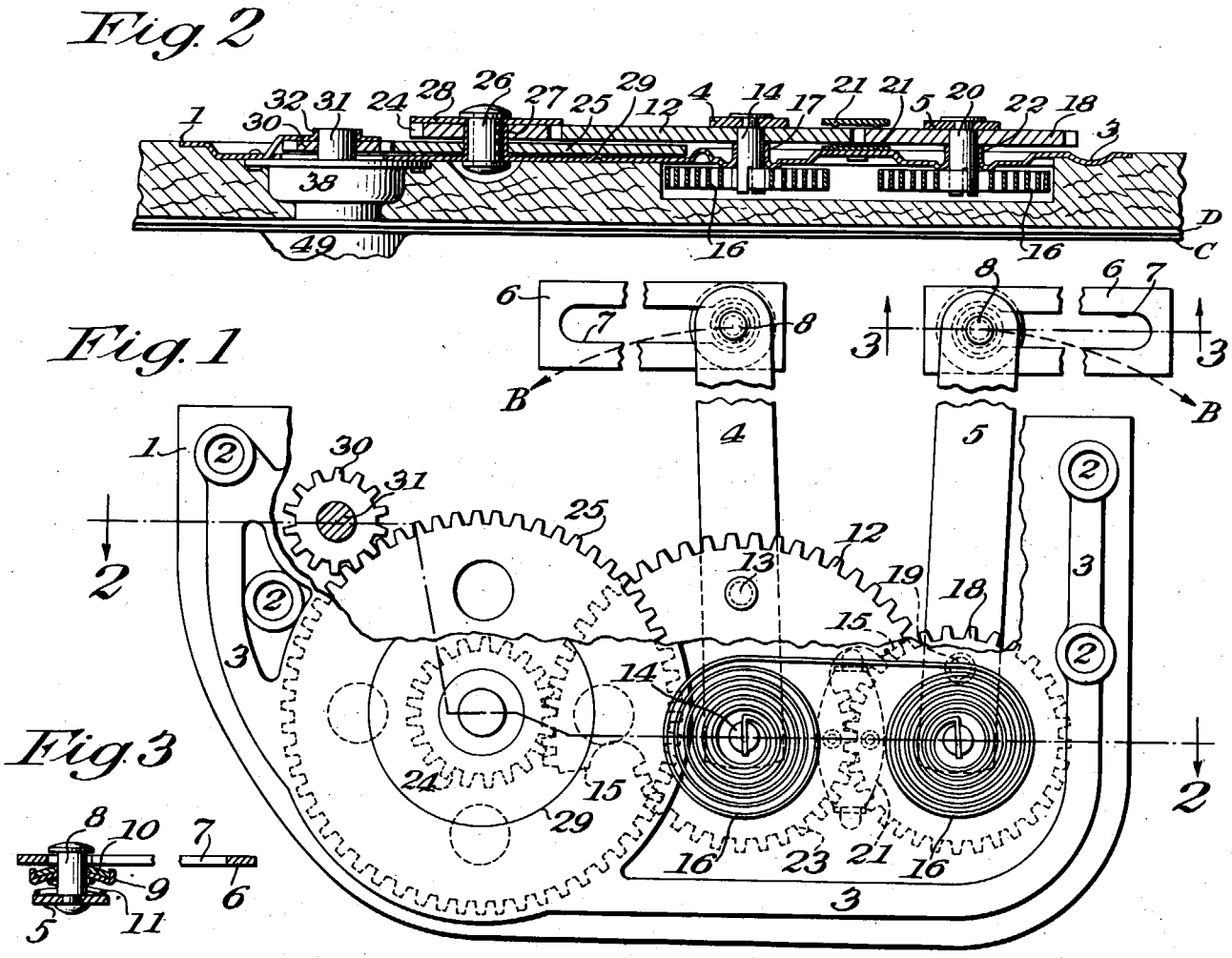
Figure 1 is a front elevation of the device with the supporting plate partially broken away exposing a part of the gears and the connecting arms to the glass broken away as indicated.
Figure 2 is a section taken substantially upon line 2—2 of Figure 1.
Figure 3 is a section taken substantially upon line 3—3 of Figure 1.

In accordance with the present preferred form of the invention, herein illustrated by way of example, there is provided a supporting plate 1 which is secured within the door of the vehicle by the customary wood screws, and the metal of the supporting plate is provided with the usual screw bosses having holes 2 for the reception of the attaching screws. The plate 1 is also preferably reinforced by embossing 3. Mounted upon the supporting plate for swinging movement in opposite directions is a pair of bars or lever arms 4 and 5, these arms being slidingly connected at their outer ends to metallic guide members 6 which are attached to the usual longitudinal metal channel secured at the lower edge of the window glass. The guide members 6 at the lower edge of the window are provided with elongated slots or openings 7 for the reception of headed studs 8 riveted to the outer ends of the arms 4 and 5, as illustrated particularly in Fig. 3. The body portions or shanks of the studs 8 are adapted to slide freely between the upper and lower horizontal edges of the guide slots 7, and the connections between the parts are maintained against rattling by means of metal cup washers 9, leather washers 10 and coil springs 11 interposed between the guide members 6 and the swinging arms 4 and 5. The guide slots 7 preferably terminate at their adjacent inner ends in enlarged openings to permit insertion of the headed studs 8 into the guide slots, as illustrated in dotted lines in Fig. 1.

In the present embodiment of the invention the swinging arm or bar 4 is secured by rivet 13 to a compound gear which comprises an outer gear segment 12 of relatively large diameter and a smaller gear 23 of relatively smaller diameter, these gears preferably being punched from the same metal blank. The compound gear 12, 23 is permanently fixed to a lateral shaft or pivot 14 rotatable in a suitable bearing 17 formed in the supporting plate 1. One end of the shaft or pivot 14 is secured to the arm 4 by riveting, as shown, and the opposite end has a slot within which is anchored one end of a double counterbalancing spring 16. The other swinging arm or bar 5 is, in the present embodiment, secured to a gear 18 by means of a rivet 19, and it is also fastened as by riveting to the outer end of a shaft or pivot 20 rotatable in a suitable bearing 22 formed in the supporting plate. The inner end of the shaft or pivot 20 has a slot within which is anchored the other end of the double or compound spring 16. It will be understood that the compound gear 12, 23 is fixed to the stud or shaft 14 and the gear 18 is in turn fixed to the stud or shaft 20. The compound spring 16 comprises two similar sets of windings produced from a single metal strand, one end of the continuous spring being thus fastened to the stud 14 and the other end to the stud 20.

One of the important features of my invention is the provision of the compound gear comprising gears 12 and 23 of different diameters. In the present instance the gear 23 has the same diameter as gear 18 which meshes therewith. Gear sector 12 is also formed so that at the termination of its teeth there are provided positive stops 15 engageable with the connecting gear 18 to limit the rotating movement of gear 12 and thereby limit the operation of the arms both in lowering and elevating the glass. Gear sector 12 also meshes with a gear 24 which is connected with gear 25, the gears 24 and 25 being permanently fixed to a lateral shaft 26. The metal of plate 1 is depressed to form a bearing 27 for the said shaft and this shaft has a shouldered end riveted over a plate 28. The metal of plate 1 is also depressed or embossed upon its rear surface as at 29 to reduce the contact surface between the adjacent surfaces of plate 1 and gear 25. Gear 25 meshes with a pinion 30 permanently fixed to a lateral shaft 31, the metal of plate 1 being depressed as at 32 to form a bearing for the outer end of said shaft. A suitable crank handle of any conventional type (not shown) is connected to the inner end of shaft 31 so that upon turning the handle the arms 4 and 5 will be swung in opposite directions through the gearing to raise and lower the window.

From the foregoing it will be seen that the swinging arm 4 is attached through its pivot or shaft 14 to a compound gear preferably formed from a single metal blank, comprising a gear portion 23 having the same diameter as the gear 18 and also comprising a gear portion or sector 12 of larger diameter which is driven from the operating handle 33 through the medium of gears 30, 25 and 24. It is to be noted that each of the sectors 12 and 23 of the compound gear has an independent series of external teeth which are principally disposed at opposite sides of the pivot or pivotal axis 14 of the compound gear. The position of the terminal ends 15 of gear sector 12 determines the range of swinging movement of the arms 4 and 5 in both directions, since the ends 15 provide stops effective upon engagement with gear 18 to limit the movement of the arms. This operation is obtained by reason of the fact that the gear portions 12 and 23 lie in a common plane coincident with the plane of the gear 18. It will further be seen that I have provided a counterbalancing spring for the swinging arms, this spring being formed into two sets of reverse windings from a single continuous strand, one set being connected with each of the arms 4 and 5. A relatively simple spring construction is thus provided as a result of which equal tension will at all times be exerted upon the arms.

I claim:

1. In a window control mechanism, a pair of swinging bars adapted to be connected to a glass supporting channel, a vertically arranged plate for the support of the said mechanism, a gear to which the lower end of one of the said bars is secured, a second gear secured to the lower end of the other bar and having a toothed portion of the same diameter as that of the first-named gear and meshing with the same, another portion of said second named gear having teeth formed so as to produce a gear of a greater diameter than the first named portion thereof.

2. In a window regulator adapted to raise and lower a window pane, a base, a pair of arms pivotally mounted from the base, means to connect the arms with the window pane, a gear fixed with respect to each arm and concentric about its pivotal mounting, said gears meshing so that the arms move about their pivotal supports in unison to raise and lower the window pane, a gear segment fixed to one of said gears, an operating handle, and gear means for drivingly connecting the operating handle with said gear segment.

3. A window regulator for raising and lowering a window pane comprising, a base, a first arm pivotally supported from the base, a second arm pivotally supported from the base, a gear segment fixed to the first arm, a compound gear segment fixed to the second arm, said compound gear segment having gear teeth meshing with the gear segment fixed to the first arm and a second set of gear teeth of different pitch diameter, operating means to swing the lever arms about their respective pivotal supports drivingly connected with said second set of gear teeth on the compound gear segment, and means to connect the outer free end portions of the lever arms with the window pane.

4. In a window regulator of the character described, a base plate, spaced pivots carried by the base plate, a first and second gear of different diameters carried by a common pivot to be rotatable about its axis and both disposed at the same side of the base plate, a third gear carried by the other pivot to be rotatable about its axis and meshing with the second gear, window pane actuating arms immovably connected with the meshing gears, and drive means having a gear connection with the first gear.

5. In a window regulator, a base, spaced pivots carried by the base, two gears of different diameters rotatable about the axis of one pivot, both of said gears being disposed at the same side of the base and having their teeth lying in a common plane, a gear rotatable about the axis of the other pivot and meshing with one of said two gears, window pane actuating arms immovably connected with said meshed gears, and drive means having a gear connection with the other of said two gears.

6. In a window regulator, a base, spaced pivots mounted on the base, two gear segments of different pitch diameters rotatable about the axis of one of said pivots, both of said gear segments lying entirely in a common plane at the same side of the base, a gear rotatable about the axis of the other pivot and meshing with one of said gear segments, window pane actuating arms immovably connected with said gear and the gear segment meshing therewith, and drive means having a gear connection with the other gear segment.

7. In a window regulator, a base plate, spaced pivots carried by the base plate, meshing gears rotatable about the axes of the spaced pivots, said gears being formed of relatively thin flat stock and lying closely adjacent one face of the base plate, a pair of window pane actuating arms on the same side of the base plate and each immovably connected with one of said meshing gears, a gear segment formed as an integral part of one of the gears, and having a different diameter than said gear, and drive means having a gear connection with said gear segment.

8. In a window regulator, a support, a pair of oppositely swinging arms carried by the support and adapted to be connected to a window for raising and lowering the same, a gear secured to each arm and meshing one with the other to swing the arms, one of said gears having an independent integral gear portion of different diameter, and means for driving said gear portion to swing said arms.

9. In a window regulator, a support, a pair of oppositely swinging arms carried by the support and adapted to be connected to a window for raising and lowering the same, a compound gear attached to one arm and comprising two independent gear portions formed from a single metal blank, a gear secured to the other arm and meshing with one of said gear portions, a fourth gear cooperating with the other of said gear portions, said last named gear portion having a part forming a stop effective in cooperation with said second named gear to limit the movement of the arms.

10. In a window regulator, a support, a pair of swinging arms adapted to be connected to the lower edge of a window for raising and lowering the same, a compound gear rotatable on the support for swinging said arms and comprising two gears of different diameters formed from the same metal blank, and a third gear meshing with the smaller diameter gear of the compound gear and secured to one of the arms for swinging the same, the larger diameter gear of the compound gear having a part cooperable with said third gear for limiting the range of swinging movement of the arms.

11. In a window regulator, a support, a compound gear rotatably mounted on the support and comprising two gears of different diameters fixed together and located at the same side of the support, a third gear meshing with one of said two gears, and a pair of oppositely swinging window pane actuating arms operated from said compound gear, one of said arms being fixed to said compound gear.

12. In a window regulator, a support, a compound gear rotatably mounted on the support and comprising two gears of different diameters fixed together and located at the same side of the support, a third gear meshing with one of the said two gears and having the same diameter, and a pair of oppositely swinging window pane actuating arms operating from said compound gear, one of said arms being fixed to said third gear and the other of said arms being fixed to said compound gear.

13. In a window regulator, a support, a compound gear rotatably mounted on the support and comprising two gears of different diameters formed from the same metal blank and located at the same side of the support, a third gear drivingly connected with one of said two gears and located externally of the compound gear, and a pair of oppositely swinging window panel actuating arms operated in unison from said compound gear, one of said arms being fixed to said third gear.

14. In a window regulator, a support, a pair of swinging arms adapted to be connected to the lower edge of a window for raising and lowering the same, a compound gear rotatable on the support for swinging said arms and comprising two gears of different diameters formed from the same metal blank, and a third gear meshing with the smaller diameter gear of the compound gear and secured to one of the arms for swinging the same, said third gear having the same diameter as said smaller gear and located externally of the compound gear.

15. In a window regulator, a support, a pair of oppositely swinging arms carried by the support and adapted to be connected to a window for raising and lowering the same, a compound gear attached to one arm and comprising two independent gear portions having external teeth extending in opopsite directions formed from a single metal blank, a gear secured to the other arm and meshing with one of said gear portions, a fourth gear cooperating with the other of said gear portions, and means for driving said fourth gear.

16. In a window regulator, a support, a pair of oppositely swinging arms carried by the support and adapted to be connected to a window for raising and lowering the same, a compound gear attached to one arm and comprising two independent gear sectors of different diameters formed from a single metal blank and having external teeth principally disposed on different sides of the point of attachment of said compound gear to said arm, a gear secured to the other arm and meshing with one of said toothed sectors, and a fourth gear cooperating with the other of said sectors for driving the same.

17. In a window regulator, a support, a compound gear, a pivot for rotatably mounting the gear on the support, said compound gear comprising a relatively large sector having external teeth along its outer edge disposed principally at one side of said pivot and also comprising a relatively small gear sector fixed thereto and having external gear teeth along its outer edge located principally at the opposite side of said pivot, and a pair of oppositely swinging window pane actuating arms operated from the compound gear, one of said arms being secured to said compound gear.

18. In a window regulator, a support, a compound gear, a pivot for rotatably mounting the gear on the support, said compound gear comprising a relatively large sector having external teeth along its outer edge disposed principally at one side of said pivot and also comprising a relatively small gear sector fixed thereto and having external gear teeth along its outer edge located principally at the opposite side of said pivot, a pair of oppositely swinging window pane actuating arms operated from the compound gear, one of said arms being secured to said compound gear, and a third gear meshing with the smaller gear sector and having the same diameter as the latter.

19. In a window control mechanism, a pair of swinging bars adapted to be connected to a glass supporting channel, a vertically arranged plate for the support of the said mechanism, a gear to which the lower end of one of the said bars is secured, a second gear secured to the lower end of the other bar and having a toothed portion of the same diameter as that of the first-named gear and meshing with the same, another portion of said second named gear having teeth formed so as to produce a gear of a greater diameter than the first named portion thereof, one of said gears having a stop effective to permit limitation of the movement of said swinging bars.

JOHN H. ROETHEL.